United States Patent [19]

Dudar

[11] 4,239,184
[45] Dec. 16, 1980

[54] VALVE STEM

[76] Inventor: Walter H. Dudar, 1227 Levee St., Dallas, Tex. 75207

[21] Appl. No.: 26,545

[22] Filed: Apr. 3, 1979

Related U.S. Application Data

[63] Continuation of Ser. No. 890,200, Mar. 27, 1978, abandoned, which is a continuation of Ser. No. 749,228, Dec. 10, 1976, abandoned.

[51] Int. Cl.³ .......................... F16K 51/00; B65B 3/00
[52] U.S. Cl. .................................. 251/149.6; 137/231; 137/232; 141/367; 141/383; 285/12
[58] Field of Search ..................... 137/231, 232, 800; 141/38, 311 R, 367, 382–386, 346–349, 291; 251/149.1, 149.6, 149.7; 285/12, 177

[56] References Cited

U.S. PATENT DOCUMENTS

| 629,786 | 8/1899 | Goss | 137/232 |
| 3,567,175 | 3/1971 | Scinto | 251/149.6 |
| 3,811,006 | 5/1974 | Burnell et al. | 137/232 X |

Primary Examiner—Frederick R. Schmidt
Attorney, Agent, or Firm—John D. Pope, III

[57] ABSTRACT

A construction for valve stems for vehicle tires is provided which fits them to accept quick connect and disconnect connectors. The stem is equally functional with quick connect connectors of different sizes and provides a protective covering for the entrance to the valve stem which is quickly removed when the connector is to be affixed.

5 Claims, 9 Drawing Figures

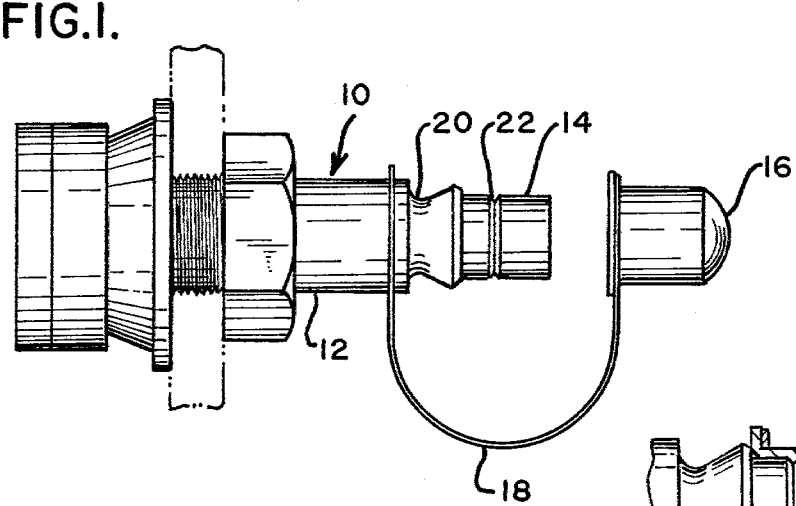
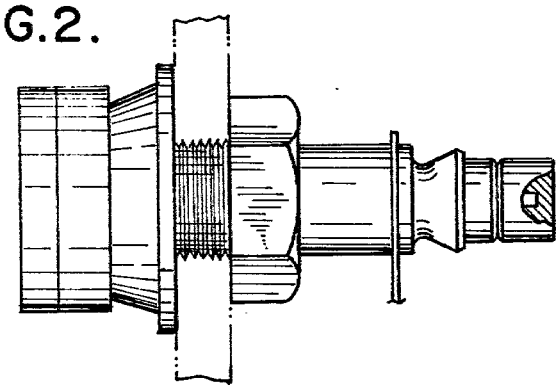
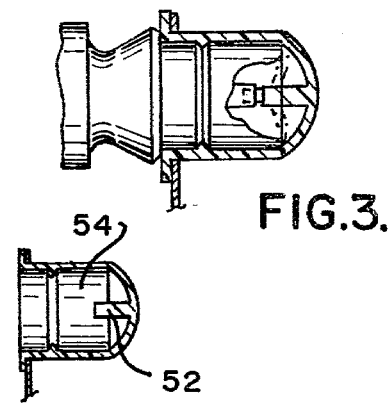
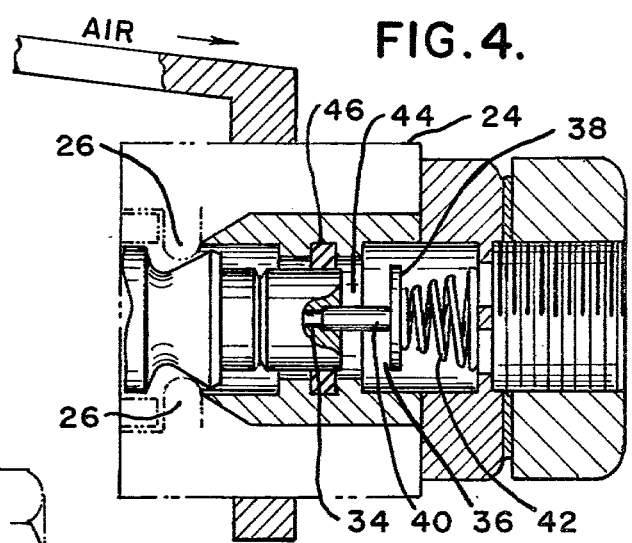
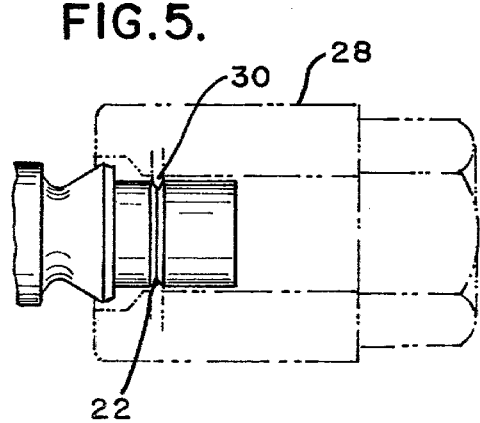

VALVE STEM

This is a continuation of application Ser. No. 890,200, filed Mar. 27, 1978 now abandoned which was a continuation of application Ser. No. 749,228, filed Dec. 10, 1976 now abandoned.

This invention relates to valve stems for vehicle tires and particularly to such valve stems on truck tires, especially those for multi wheeled vehicles.

It is well known that proper inflation of tires on vehicles is an important factor not only in the operation thereof but in decreasing the cost of maintenance and repair. This factor is particularly important with commercial vehicles such as trucks, yet with multi wheeled units is frequently neglected because of the time and trouble necessary for the proper maintenance of air pressure.

The structure of my U.S. Pat. No. 3,913,632 is of great assistance in overcoming the reluctance of truck operators to adequately maintain their vehicles. The structure of U.S. Pat. No. 3,913,632, particularly when combined with the adaptor of my copending application, Ser. No. 697,998, filed June 21, 1976, speeds up the checking of air pressure in vehicle tires, particularly truck tires, and also provides warning of a leaky valve core. On the other hand, provision of a valve stem which can be incorporated into the tires of vehicles, especially multi wheeled vehicles generally, would further decrease the expense of securing willing cooperation of truck operators and simplify the securement of these benefits on a wider scale.

Among the objects of the present invention are the provision of a valve stem structure for vehicle tires which expedites the checking and maintenance of proper air pressure in the tires; the provision of such valve stems which can be readily manufactured without troublesome changes in manufacturing processes and equipment; the provision of such valve stems which cooperate with a standard quick connect and disconnect coupling to connect a compressed air source to the vehicle tire; the provision of such valve stems which function effectively with different sized quick connect couplers and the provision of such valve stems which are inexpensive to manufacture and effective in operation. Other objects and features will be in part apparent and in part pointed out hereinafter.

The invention accordingly comprises the constructions hereinafter described, the scope of the invention being indicated in the following claims.

In the accompanying drawings, in which several possible embodiments of the invention are illustrated, FIG. 1 is an enlarged view of one form of the valve stem of the present invention;

FIG. 2 is a view similar to FIG. 1 but with parts broken away;

FIG. 3 is a view similar to FIG. 2 but with the cap in place;

FIG. 4 is a section showing the valve stem connected to a quick connect coupling;

FIG. 5 is a view similar to FIG. 4 but with one stem connected to a smaller quick connect coupling;

Corresponding reference characters indicate corresponding parts throughout the several views of the drawings.

Figure 8:
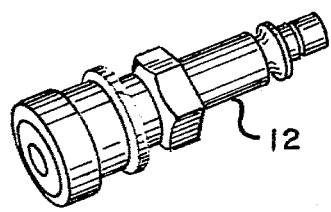
FIG. 8 is a truck and bus tubeless valve stem altered to incorporate my invention.

In FIG. 1 a valve stem 10 of the type illustrated in FIG. 8 but shown on an enlarged scale consists of a body portion 12 adapted to receive and hold in operating position a valve core of the usual type. As is customary, the valve core controls the passage of air into and out of a tire to which valve stem 10 is attached. The portion of body 12 which projects from the tire to form end 14 is, in my valve stem, smooth to provide a friction fit for a cap 16. Cap 16 is connected by a strap 18 to body 12.

Body 12 is formed with a groove 20 and a groove 22 adjacent end 14 in order to accept and accomodate quick connect and disconnect couplers. Such a coupler is shown connected in FIGS. 4, 5 and 6. In FIG. 4 a quick connect coupler 24, having a stop 26, is shown in juxtaposition to stem 10 with stop 26 engaging groove 20. Stop 26 and groove 20 hold the connector in place on stem 10 until it is removed.

In FIG. 5 a smaller quick connect and disconnect coupler 28 is shown attached to stem 10 by means of stop 30. Stop 30 and groove 22 hold the connector in place on stem 10 until it is removed.

Figure 6:
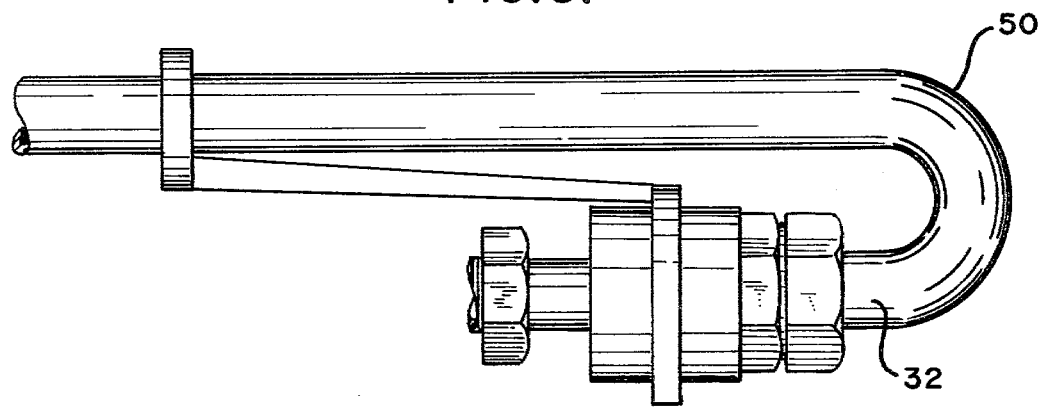
FIG. 6 is a view similar to FIG. 5 but with the quick connect coupling mounted to facilitate access to a valve stem facing to the inside.
Figure 7:
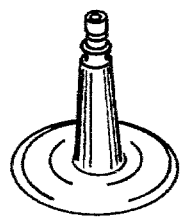
FIG. 7 is a valve stem of the auto tube type but altered to incorporate my invention.
Figure 9:
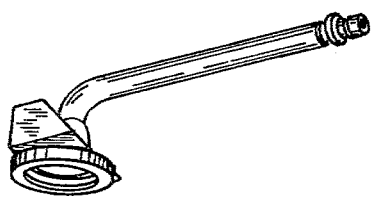
FIG. 9 is a truck and bus valve stem of another type incorporating the structure of my invention.

In FIG. 6 quick connect and disconnect coupler 32 is shown attached to a valve stem 10 of the configuration illustrated in FIG. 9 which is particularly suited for certain truck and bus tires.

As shown in FIG. 4 the quick connect coupler should include a valve depressant 36 consisting of a plate 38 on which is mounted a finger 40. A spring 42 presses plate 38 and finger 40 forward to depress the stem of valve core 34 to admit air to the tire. This opens a path for air into the tire. When coupler 24 is removed from the end 14 of valve stem 10, spring 42 moves plate 38 toward the left as shown in FIG. 4 to seat it in circular area 44 against O-ring 46 to shut off the flow of air from coupler 24.

To advantageously position a coupler 32 to engage valve stem 10 on an outside truck tire (see also FIG. 9) it is at times preferable to form the end of the air conduit (see FIG. 6) in the form of a 180° angle bend 50 to position the quick connect coupler for attachment to the valve stem. On such outside tires the valve stem customarily faces the inside. The 180° angle bend 50 enables easy attachment of the connector in such instances.

Cap 16 is preferably constructed with a depressant post 52 which projects into the body of the cap to meet the stem of valve core 34. When post 52 is pressed the consequent movement of the stem of valve core 34 releases air into the cavity 54 of cap 16 to blow the cap away from end 14. This not only permits ready access to valve stem 10 in order to affix a quick connect coupler thereto but also provides a warning of a leaky valve core if it is found dislodged before depressant 52 is actuated.

From the foregoing it is clear that the valve stem of the present invention accommodates both small and large chucks which form part of quick connect couplers, protects the opening of the valve stem from entry of dirt or other debris between operations and also functions as a warning of a faulty valve core. The cap is easily removed when the tire is being inflated or its pressure is to be checked or adjusted.

The valve stem of the present invention can be manufactured using existing machinery with only minor changes. Instead of threading the end of the valve stem it is formed to receive the friction fit of cap 16 and cap 16 is attached by a strap to body 12.

The simplicity of oeration of tire pressure checking and adjustment resulting from use of the construction described renders the whole operation less burdensome and time consuming so that a vehicle operator is less likely to disregard the check and resulting wear and repairs are either eliminated or greatly reduced.

Particularly when utilized with the structure of my U.S. Pat. No. 3,913,632, air pressure maintenance for multi wheeled vehicles is greatly facilitated and is accordingly more likely to be performed as directed by owners rather than shirked by operators.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A valve stem for a vehicle tire comprising a body portion sized to receive and hold in operative position a valve core to control passage of air into and out of a tire, said valve stem having a plurality of separate grooves recessed into the body portion of the stem on the outside of the stem and at an area of the stem remote from the tire, said grooves being separate from each other and unconnected to each other, each of said grooves being positioned and of different sizes to accept and removably lock quick connect couplers of various sizes to the stem.

2. A valve stem according to claim 1 in which a cap sized to fit over the end of the stem is attached to said end.

3. A valve stem according to claim 2 in which the cap has means in its crown which upon the application of pressure thereto moves into cooperatative relationship with the stem of a valve core in the stem releasing air between the stem and the cap assisting removal of the cap.

4. A valve stem according to claim 1 in which each groove is sized and positioned so as to accommodate the stop of a quick connect coupler and removably lock the stop of the coupler to the valve stem.

5. A valve stem according to claim 4 in which the grooves are of at least two different sizes.

* * * * *